US007621552B2

(12) United States Patent
Bergum et al.

(10) Patent No.: US 7,621,552 B2
(45) Date of Patent: *Nov. 24, 2009

(54) CHILDREN'S RIDE-ON VEHICLE ASSEMBLIES HAVING TRAILING VEHICLE DETECTION SYSTEMS

(75) Inventors: Mark J. Bergum, Clarence, NY (US); William R. Howell, Chaffee, NY (US); Gary G. Lenihan, East Aurora, NY (US); David G. Waples, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/728,049

(22) Filed: Mar. 23, 2007

(65) Prior Publication Data

US 2007/0222181 A1  Sep. 27, 2007

Related U.S. Application Data

(63) Continuation of application No. 10/966,991, filed on Oct. 15, 2004, now Pat. No. 7,207,588.

(60) Provisional application No. 60/589,267, filed on Jul. 19, 2004.

(51) Int. Cl.
 *B60D 1/24* (2006.01)
(52) U.S. Cl. .................................. 280/446.1
(58) Field of Classification Search ............... 280/446.1
 See application file for complete search history.

(56) References Cited

U.S. PATENT DOCUMENTS 2,201,910 A   5/1940   Meienborn
2,233,116 A   2/1941   Voorheis (Continued)

FOREIGN PATENT DOCUMENTS

DE   3700947 A1   7/1988

(Continued)

OTHER PUBLICATIONS

Estes, Bill, "PullRite: The Ultimate Sway Control," Trailer Life, Dec. 1989.

(Continued)

*Primary Examiner*—Lesley D Morris
*Assistant Examiner*—Daniel Yeagley
(74) *Attorney, Agent, or Firm*—Dascenzo Intelllectual Property Law, P.C.

(57) ABSTRACT

Children's ride-on vehicle assemblies having leading and trailing vehicles that are removably coupled together by a connection apparatus. The leading vehicle is an independently operable ride-on vehicle having a drive assembly that is selectively configured between a plurality of drive configurations, such as responsive to user inputs via user input devices. The assembly further includes a detection system adapted to detect whether or not the connection apparatus is in its coupled configuration and to restrict the plurality of drive configurations responsive thereto. This restriction may be automatic responsive to coupling of the leading and trailing vehicles together, and it may be made regardless of user inputs that otherwise would select and/or enable one of the restricted drive configurations.

20 Claims, 5 Drawing Sheets

U.S. PATENT DOCUMENTS

| | | | |
|---|---|---|---|
| 2,493,874 A | 1/1950 | Hume | |
| 2,602,266 A | 7/1952 | Preston | |
| 3,305,246 A | 2/1967 | Gonczy et al. | |
| 3,733,090 A | 5/1973 | Keller | |
| 3,822,501 A | 7/1974 | Kelterstr | |
| 3,947,839 A | 3/1976 | Zigmant | |
| 3,964,767 A | 6/1976 | Williams | |
| 4,025,085 A | 5/1977 | Jacobs | |
| 4,040,006 A | 8/1977 | Kimmel | |
| 4,122,390 A | 10/1978 | Kollitz et al. | |
| 4,204,700 A | 5/1980 | Haines, Sr. | |
| 4,211,428 A | 7/1980 | Barcus | |
| 4,232,910 A | 11/1980 | Snyder | |
| 4,254,998 A | 3/1981 | Marshall et al. | |
| 4,304,066 A | 12/1981 | Brand et al. | |
| 4,366,645 A | 1/1983 | Crain et al. | |
| 4,372,075 A | 2/1983 | Harkins | |
| 4,512,483 A | 4/1985 | Crossley et al. | |
| 4,516,948 A | 5/1985 | Obara | |
| 4,556,232 A | 12/1985 | Sever | |
| 4,558,263 A | 12/1985 | Harris et al. | |
| 4,617,001 A | 10/1986 | Parein | |
| 4,627,633 A | 12/1986 | Gehman et al. | |
| 4,700,966 A | 10/1987 | Hawkins et al. | |
| 4,708,683 A | 11/1987 | Lehmann et al. | |
| 4,771,838 A * | 9/1988 | Ketcham | 180/6.62 |
| 4,824,135 A | 4/1989 | McGregor | |
| 5,149,121 A | 9/1992 | Hafner | |
| 5,209,693 A | 5/1993 | Lyman | |
| 5,232,271 A | 8/1993 | Cobble et al. | |
| 5,421,600 A | 6/1995 | Jones et al. | |
| 5,558,351 A | 9/1996 | Hunter | |
| 5,644,114 A | 7/1997 | Neaves | |
| 5,810,095 A * | 9/1998 | Orbach et al. | 172/2 |
| 5,859,509 A | 1/1999 | Bienz et al. | |
| 5,924,910 A | 7/1999 | Liu | |
| 5,995,895 A * | 11/1999 | Watt et al. | 701/50 |
| 6,292,094 B1 | 9/2001 | Deng et al. | |
| 6,481,738 B1 | 11/2002 | Duncan et al. | |
| 6,672,936 B1 | 1/2004 | Shaffer | |
| 6,771,034 B2 | 8/2004 | Reile et al. | |
| 2007/0032913 A1* | 2/2007 | Ghoneim et al. | 701/1 |

FOREIGN PATENT DOCUMENTS

| | | |
|---|---|---|
| DE | 29701360 U1 | 4/1997 |
| EP | 0044148 A1 | 1/1982 |
| JP | 11124051 A * | 5/1999 |

OTHER PUBLICATIONS

"The PullRite Principle," Pulliam Enterprises, Inc., www.pullrite.com Web site, 1996.

"70 Degree PullRite," "90 Degree PullRite," and "Camper Special," www.pullrite.com Web site, 2004.

* cited by examiner

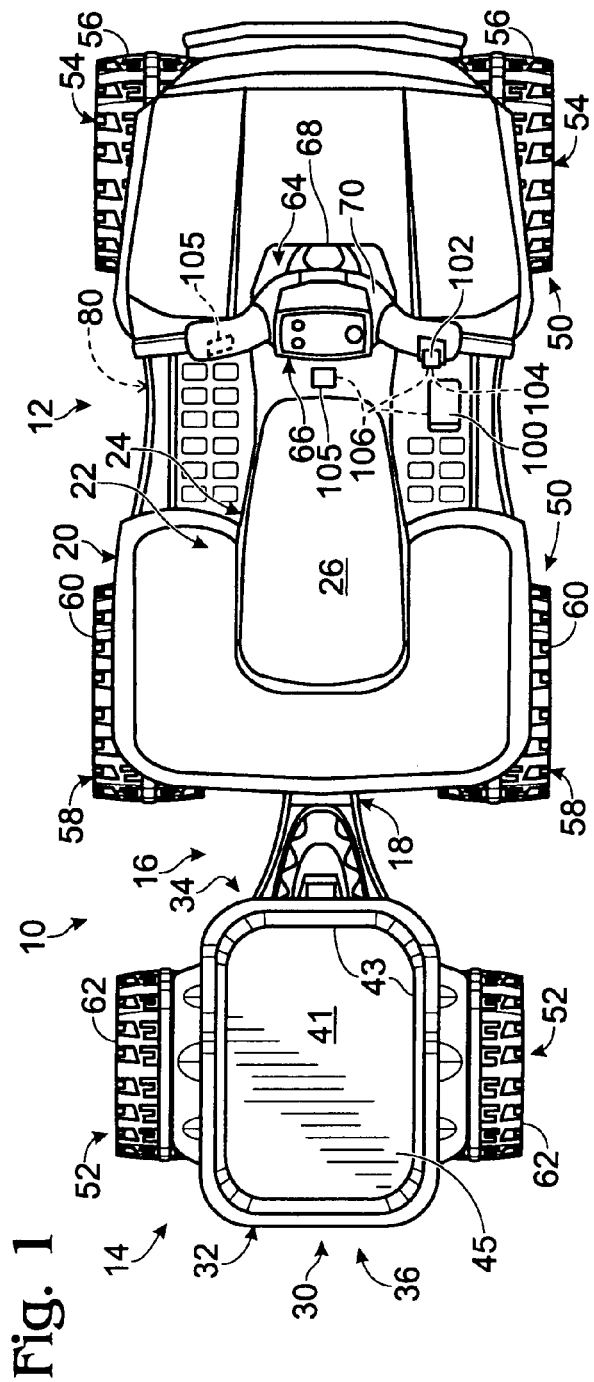

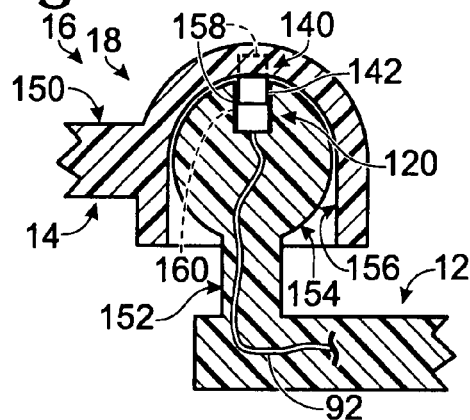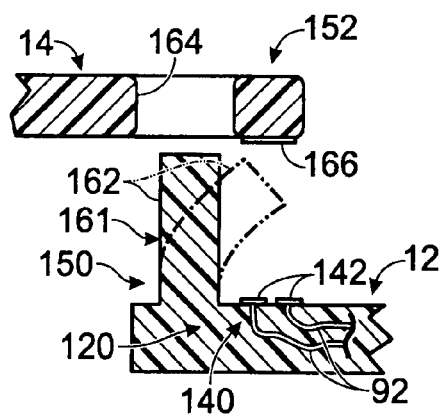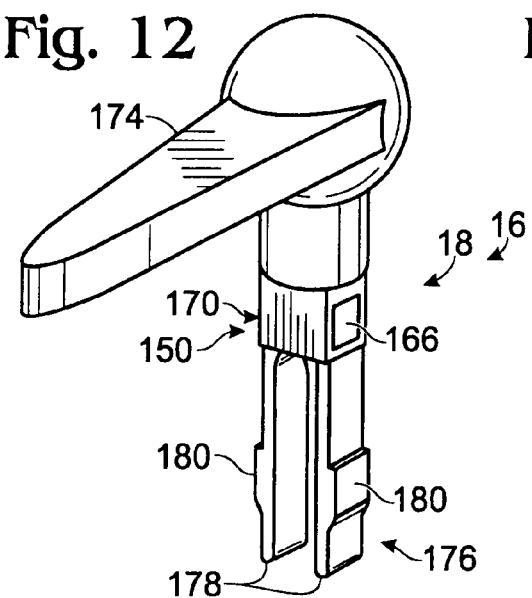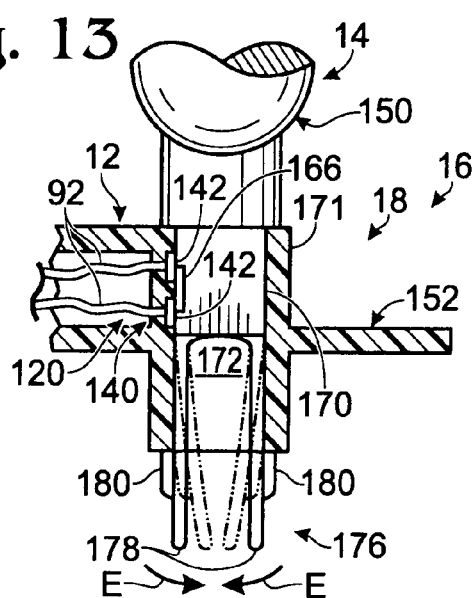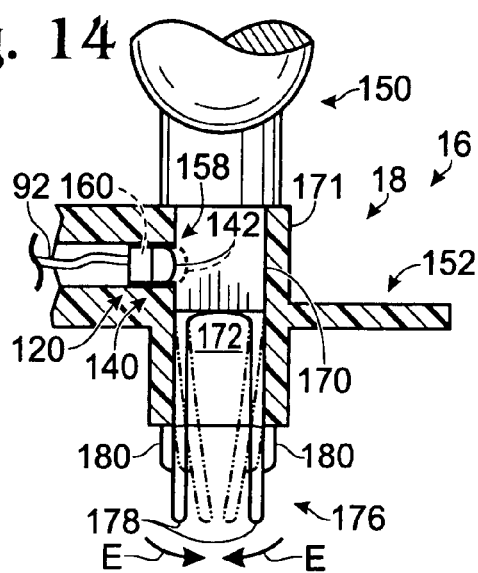

CHILDREN'S RIDE-ON VEHICLE ASSEMBLIES HAVING TRAILING VEHICLE DETECTION SYSTEMS

RELATED APPLICATIONS

This application is a continuation patent application that claims priority to U.S. patent application Ser. No. 10/966,991, which was filed on Oct. 15, 2004 now U.S. Pat. No. 7,207,588 and claims priority to U.S. Provisional Patent Application Ser. No. 60/589,267, which was filed on Jul. 19, 2004 and is entitled "Pinch-Resistant Hitch Assembly and Children's Ride-On Vehicle Assemblies Including the Same." The complete disclosures of the above-identified patent applications are hereby incorporated by reference for all purposes.

TECHNICAL FIELD

The present disclosure relates generally to children's ride-on vehicles, and more particularly to battery-powered children's ride-on vehicle assemblies having a children's ride-on vehicle and a detection system for a trailing vehicle.

BACKGROUND

Children's ride-on vehicles are reduced-scale vehicles that are designed and sized for use by children. A ride-on vehicle includes a seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. Typically, the drive assembly will include an actuator, such as a foot pedal, push button or other user input device, which enables a child to select when power is delivered to the motor assembly. Some drive assemblies further include other user input devices, such as a speed selector and a direction selector, which are operated by a child sitting on the ride-on vehicle's seat to select the speed and direction at which the vehicle's drive assembly is configured to propel the vehicle along a ground surface.

SUMMARY

The present disclosure is directed to battery-powered children's ride-on vehicle assemblies having a leading vehicle and a towed, or trailing, vehicle that is adapted to be removably coupled to the leading vehicle. The disclosure is further directed to detection systems that are adapted to detect when the trailing vehicle is coupled to the leading vehicle, with the detection system interacting with the drive assembly of the leading vehicle responsive to the detection that the trailing vehicle is coupled thereto. In some embodiments, the available drive configurations of the leading vehicle's drive assembly are restricted responsive to detection that the trailing vehicle is coupled to the leading vehicle. In some embodiments, the restricted drive configurations include one or more of the speed configuration and the direction configuration of the leading vehicle. In some embodiments, the available drive configurations are a subset of a plurality of drive configurations into which the drive assembly of the leading vehicle is otherwise selectively configurable, such as responsive to user inputs to one or more user input devices. In some embodiments, the detection system includes a sensor assembly that is adapted to detect when the trailing vehicle is coupled to the leading vehicle. The drive assembly may be adapted to restrict the drive configurations of the leading vehicle when the sensor assembly detects that the trailing vehicle is coupled thereto regardless of user inputs that otherwise would select and/or enable one of the restricted drive configurations.

BRIEF DESCRIPTION OF THE DRAWINGS

FIG. 1 is a top plan view of a children's ride-on vehicle assembly having a leading vehicle and a trailing vehicle.

FIG. 2 is a side view of the children's ride-on vehicle assembly of FIG. 1.

FIG. 10 is a fragmentary side elevation view showing an illustrative connection apparatus with a trailing vehicle detection system according to the present disclosure.

FIG. 11 is a fragmentary side elevation view showing an illustrative connection apparatus with a trailing vehicle detection system according to the present disclosure.

FIG. 12 is a perspective view of an illustrative portion of a connection apparatus according to the present disclosure.

FIG. 13 is a fragmentary side elevation view showing an illustrative connection apparatus with a trailing vehicle detection system according to the present disclosure.

FIG. 14 is a fragmentary side elevation view showing an illustrative connection apparatus with a trailing vehicle detection system according to the present disclosure.

DETAILED DESCRIPTION AND BEST MODE OF THE DISCLOSURE

Figure 3:
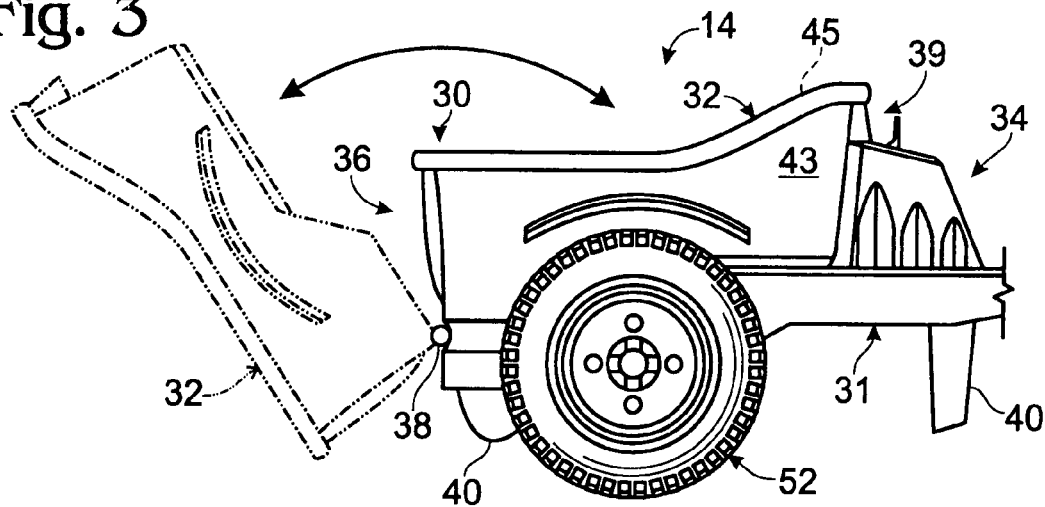
FIG. 3 is a side elevation view of the trailing vehicle of the children's ride-on vehicle assembly of FIG. 1, showing pivotal movement of a bed portion relative to a frame, or chassis, of the trailing vehicle body.

An illustrative example of a children's ride-on vehicle assembly is shown in FIGS. 1 and 2, and is indicated generally at 10. Ride-on vehicle assembly 10 includes a leading vehicle 12. Unlike conventional children's ride-on vehicles, assembly 10 further includes a towed, or trailing, vehicle 14. As illustrated, the leading and trailing vehicles are reduced-scale vehicles that are sized and designed for use by children.

Trailing vehicle 14 is releasably, or removably, coupled to the leading vehicle by a connection apparatus, or connection assembly, 16, as will be discussed in more detail herein. By "releasably, or removably, coupled," it is meant that the vehicle assembly is designed to permit the leading vehicle to be used with or without the trailing vehicle being coupled thereto. Therefore, the leading vehicle may be used as an independently operable children's ride-on vehicle. When it is desirable to couple the trailing vehicle to the leading vehicle, such as to transport a child passenger, or rider, with the trailing vehicle, to transport toys or other objects, or simply to increase the play value of the vehicle assembly, the trailing vehicle may be coupled to the leading vehicle. In other words, the vehicles are designed to be repeatedly coupled together and disconnected, with the connection apparatus being adapted to retain the vehicles in a coupled configuration until a child, parent or other individual uncouples the vehicles. The connection apparatus may be described as being in a coupled configuration when the trailing vehicle is coupled to the leading vehicle by the connection apparatus for relative movement therewith, and in an uncoupled configuration when the trailing vehicle is not coupled to the leading vehicle by the connection apparatus. Similarly, the leading and trailing vehicles may be described as being in coupled and uncoupled configurations depending upon whether or not the vehicles are coupled for relative movement as a unit by the connection apparatus.

Connection apparatus 16 may provide a pivotal connection with the leading and trailing vehicles. Alternatively, the connection apparatus may provide a fixed, or non-pivotal, connection between the interconnected portions of the leading and the trailing vehicles. In some embodiments, connection apparatus 16 includes a hitch assembly 18 that is configured to selectively and releasably couple and uncouple the trailing vehicle to the leading vehicle for relative movement with the leading vehicle. An illustrative example of a suitable hitch assembly is a ball-and-socket hitch that pivotally couples the trailing vehicle to the leading vehicle. However, it is within the scope of the present disclosure that the connection apparatus may be of any form suitable for selectively coupling the trailing vehicle to the leading vehicle. Other examples include pin-and-slot connectors, releasable clamps, and other mechanisms by which complimentary components of the leading and the trailing vehicles are releasably secured and retained together so that driving operation of the leading vehicle draws the trailing vehicle with the leading vehicle.

As shown in FIG. 1, leading vehicle 12 includes a leading vehicle body 20 or similar support frame, which may provide a riding space, or passenger compartment, 22 with a seat assembly 24 that is sized and configured to accommodate at least one child, including a child driver. Seat assembly 24 may be integral with or otherwise mounted on leading vehicle body 20 and may have any suitable configuration, including configurations in which the position of the seat assembly is adjustable within the passenger compartment, and configurations in which the seat assembly includes two or more seats or two or more seating regions. Typically, leading vehicle 12 will be sized for use either by a child driver or by a child driver and a child passenger. In the illustrated embodiment, seat assembly 24 includes a seat, or seating region, 26, sized and positioned to receive a child driver.

Trailing vehicle 14 includes a trailing vehicle body 30 having a front end region 34 and a rear end region 36. In the illustrated embodiment, body 30 includes a frame, or chassis, 31 and a bed 32. Also shown in FIG. 2 are optional supports 40 for the trailing vehicle. Supports 40 are adapted to support and/or orient the trailing vehicle against a ground surface, such as when the trailing vehicle is not coupled to a leading vehicle. The supports may provide a more horizontal orientation to the uncoupled trailing vehicle and/or provide a stop that engages a ground surface to inhibit rolling of the trailing vehicle along the ground surface when it is uncoupled from a leading vehicle. When the trailing vehicle includes a wheel assembly that supports the trailing vehicle in a horizontal orientation, such as a wheel assembly that includes forward and rearward wheels, supports 40 will typically not be used.

As shown in FIG. 2, the bed may be pivotal relative to the frame, with the pivotal connection formed by at least one hinge 38 or other pivotal linkage. As illustrated in FIG. 3, the bed may be adapted to pivot relative to the trailing vehicle chassis between a first position, in which the bed is supported by or otherwise retained against the chassis, such as shown in solid lines, and a second position, in which the bed is pivoted, or inclined, relative to the first position. This pivotal connection of the bed enables the trailing vehicle to be used as a dump vehicle, thereby adding play value to the vehicle assembly. For example, trailing vehicle body 30 may be adapted carry a child and/or assist in transportation of articles such as toys or similar cargo, as is appropriate for children. As perhaps best seen in FIG. 1, the illustrative example of bed 32 includes a bottom surface 41 and sidewalls 43 that extend around the perimeter of bottom surface 41. The bed may be described as defining a compartment 45 that is bounded by bottom surface 41 and sidewalls 43.

When bed 32 is pivotally coupled to the trailing vehicle's chassis, the trailing vehicle also may include a latch mechanism, which is schematically illustrated at 39, that selectively retains the bed in the first position, such as until a child manually releases the latch mechanism and pivots the bed away from the first position. As such, the latch mechanism may be described as preventing the pivoting of the bed away from the first position until the latch mechanism is released or otherwise disengaged. Latch mechanism 39 may take any suitable form, such as including a catch on a first one of the bed and the chassis, and a deflectable or repositionable detent on the other of the bed and the chassis. The latch mechanism may be, but is not required to be, biased to automatically engage, and thereby retain the bed in the first position, upon pivoting of the bed from a second position back to the first position.

Figure 5:
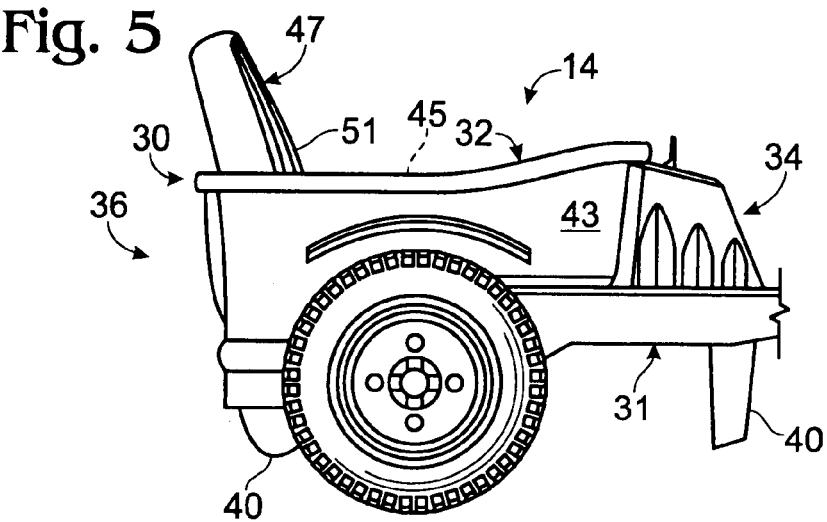
FIG. 5 is a side elevation view of another illustrative trailing vehicle that may be used with children's ride-on vehicle assemblies according to the present disclosure.
Figure 6:
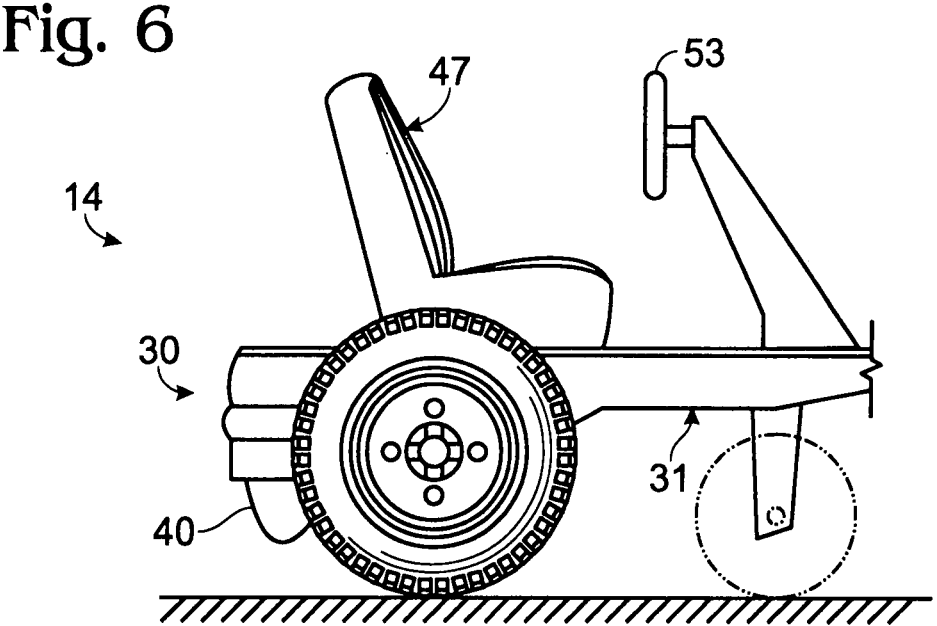
FIG. 6 is a side elevation view of another illustrative trailing vehicle that may be used with children's ride-on vehicle assemblies according to the present disclosure.

In the illustrated example of trailing vehicle 14 shown in FIGS. 1-3, the vehicle may be described as taking the general form of a trailer, wagon, or similar structure. It is within the scope of the present disclosure that the trailing vehicle may have any suitable functional and/or ornamental shape, such as to complement the leading vehicle, to add play value to the vehicle assembly, to be adapted to transport a child or specific type of article(s), etc. As further illustrative examples, the trailing vehicle may include a passenger region with at least one seat, storage compartments, and/or handlebars or other simulated or actual steering mechanisms. The trailing vehicle may resemble an independently operable ride-on or other vehicle, or, as discussed in more detail herein, may even be an independently operable children's ride-on vehicle, which may include any of the drive assemblies and/or steerable assemblies disclosed herein. Several of these illustrative configurations for trailing vehicle 14 are shown in FIGS. 4-6.

Figure 4:
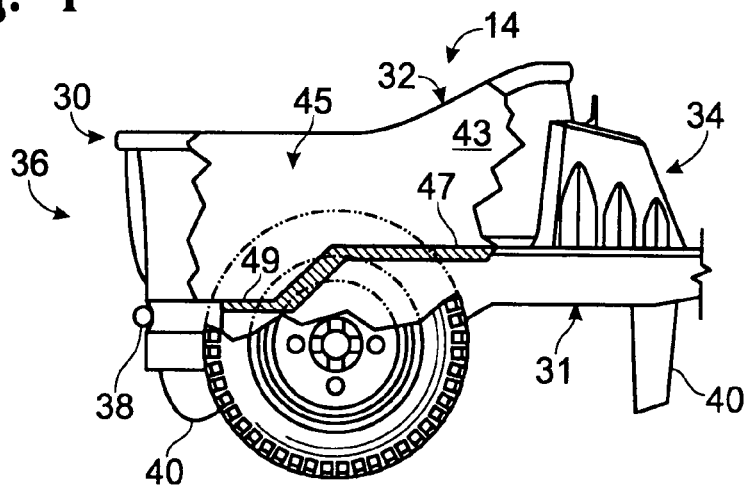
FIG. 4 is a partial cross-sectional side elevation view of another illustrative trailing vehicle that may be used with children's ride-on vehicle assemblies according to the present disclosure.

FIG. 4 illustrates a variation of the pivotal bed 32 shown in FIGS. 1-3. More particularly, FIG. 4 illustrates a pivotal bed 32 that defines a compartment 45 having a seat 47 and a footboard 49, which in the depicted example forms a surface that is positioned lower than the seat and configured to support a child's feet when the child is sitting on the seat. In FIG. 4, the bed is adapted so that the child passenger faces away from the leading vehicle when the child is sitting on the seat. It is within the scope of the present disclosure that other orientations, such as forward facing orientations may be used. A potential benefit of the rear-facing, rearward pivoting configuration shown in FIG. 4 is that the child's weight, when the child is sitting on seat 47, is primarily positioned forward of the trailing vehicle's axle (upon which its wheels are mounted) and away from hinge(s) 38. FIG. 5 illustrates an example of a trailing vehicle that includes a forward-facing seat 47 and which does not include a pivotal bed. In FIG. 5, seat 47 is shown including a back rest 51 that projects above the sidewalls of the bed.

As further variants, seat 47 may be omitted to provide a bed with a cargo compartment that is not pivotal relative to the chassis 31 of the trailing vehicle, at least one region or even all of the sidewalls may be partially or completely removed, and/or a seat and/or bed construction similar to FIG. 4 may be utilized. FIG. 6 illustrates an example of a trailing vehicle that includes a seat 47 and a body 30 that does not include a bed. Also shown in FIG. 6 is an optional steering mechanism 53, such as may be secured in a fixed orientation relative to the body to provide a hand rest for a child sitting on seat 47, may be rotatable to simulate the receipt of steering inputs, and/or which may even be coupled to a steerable wheel or wheels of the trailing vehicle to permit actual steering of the vehicle. Other simulated or actual steering mechanisms may be used in place of the illustrated (simulated or actual) steering mechanism 53, such as handlebars. FIG. 6 also demonstrates in dashed lines that the trailing vehicle may include at least one forward wheel and at least one rearward wheel, which enables the trailing vehicle to roll along a ground surface even if uncoupled from a leading vehicle. As discussed herein, at least one of these wheels may be steerable and/or driven, although it is also within the scope of the disclosure that the trailing vehicle includes only non-steerable, non-driven wheels.

Additional illustrative examples of children's ride-on vehicle assemblies, and components thereof, such as hitch assemblies and trailing vehicles, are disclosed in U.S. Provisional Patent Application Ser. No. 60/589,267, the complete disclosure of which is hereby incorporated by reference for all purposes.

As shown in FIGS. 1 and 2, leading vehicle 12 is shaped to generally resemble a reduced-scale all-terrain, or "quad," vehicle, and trailing vehicle 14 is shaped to resemble a trailer that is towed by the leading vehicle. However, children's ride-on vehicle assemblies according to the present disclosure may be shaped to generally resemble any type of vehicle or vehicles. Illustrative, non-exclusive examples of full-sized vehicles that the leading and/or trailing vehicles may be designed to resemble, albeit in a reduced-scale, child-sized version, include cars, trucks, construction vehicles, emergency vehicles, off-road vehicles, motorcycles, space vehicles, aircraft, watercraft and the like. It is also within the scope of the present disclosure that either or both of the vehicles in assembly 10 may be shaped to resemble fantasy vehicles that do not have a corresponding adult-sized counterpart. Although leading vehicle 12 is depicted in the form of a reduced-scale all-terrain vehicle, it will be appreciated that the components and/or features of vehicle assembly 10 may be configured for use on any type of children's ride-on vehicle.

Typically, at least substantial portions of each vehicle will be formed from molded plastic, although it is within the scope of the present disclosure that any suitable material, or combination of materials, may be used. When molded plastic parts are used, they may be integrally formed or formed from a plurality of parts that are secured together by screws, bolts, clips or other suitable fasteners. Vehicle assembly 10 may additionally, or alternatively, be at least partially formed from other suitable material(s), such as metal, wood, or composite materials. Vehicle assembly 10 may include an underlying frame on which a chassis is mounted, for either or both of leading vehicle 12 and trailing vehicle 14. In such an embodiment, the frame is often formed of metal and/or molded plastic, with the chassis typically formed of molded plastic.

It is within the scope of the present disclosure that vehicle assembly 10 may include more than one trailing vehicle. For example, in some embodiments, a leading vehicle may be adapted to tow more than one trailing vehicle, which may be collectively or successively coupled to the leading vehicle. Similarly, a trailing vehicle may itself include a connection apparatus, such as any of the connection apparatus that are disclosed, illustrated and/or incorporated herein, which selectively enables another trailing vehicle to be coupled thereto. Moreover, although the depicted vehicle assembly is disposed such that the leading vehicle is adapted to pull the trailing vehicle behind the leading vehicle as the leading vehicle moves over a ground surface, other configurations may be implemented. For example, the trailing vehicle may include a drive assembly that is adapted to propel the trailing vehicle along a ground surface, with the leading vehicle being pushed along the ground surface by the trailing vehicle.

As discussed above, vehicle assembly 10 further includes wheels, with each of the leading and the trailing vehicles including at least one wheel, and typically at least a pair of wheels, such as may be mounted on a common axle, or aligned axles. The wheels enable the vehicles to travel over a ground surface as the wheels are rotated. The wheels may be driven wheels, which are adapted to be rotationally driven by a drive assembly, steerable wheels, which are adapted to be pivoted or otherwise oriented to steer the ground-traveling path of the vehicle, or free wheels, which are neither positively driven nor steered. Instead, free wheels simply are rotatable, such as in response to ground-traveling movement caused by the driving rotation of a driven wheel. It is within the scope of the disclosure that a wheel is both a driven wheel and a steerable wheel, although this is not required. In many applications, it may be desirable and/or or more cost effective to have separate driven and steerable wheels.

To provide an illustrative, but not exclusive, example of a suitable wheel assembly, and with reference back to FIGS. 1 and 2, vehicle assembly 10 is indicated as including a set of wheels. As shown, a first plurality of wheels 50 are rotatably coupled to the leading vehicle 12, and a second plurality of wheels 52 are rotatably coupled to the trailing vehicle 14. The first plurality of wheels includes a steerable wheel assembly 54 containing at least one steerable wheel 56, and a driven wheel assembly 58 containing at least one driven wheel 60. In the illustrated example, a pair of steerable wheels and a pair of driven wheels are shown in the first plurality of wheels, but the number and configuration of these wheels may vary within the scope of the present disclosure. Similarly, the second plurality of wheels includes a pair of free wheels 62 in the illustrated example, but the number and configuration of these wheels also may vary within the scope of the present disclosure.

As indicated at 64 in FIGS. 1 and 2, at least the leading vehicle includes a steering assembly that is adapted to receive steering inputs and steer the steerable wheel assembly responsive to the received steering inputs. Any suitable structure may be used to receive steering inputs, such as from a child sitting on the vehicle's seat, and to steer the steerable wheel(s) responsive thereto. The steering inputs received from a child sitting on seat 26 may be referred to as user-imparted steering inputs. In FIGS. 1 and 2, steering assembly 64 is shown including a steering mechanism 66 that is interconnected to steerable wheels 56 via a steering column 68. In FIGS. 1 and 2, steering mechanism 66 takes the form of handlebars 70. However, it is within the scope of the present disclosure that other mechanisms may be used, such as a steering wheel or steering levers. As discussed, it is also within the scope of the present disclosure that the trailing vehicle also may include a steering assembly. However, when the trailing vehicle is not configured for selective use as an independently operable children's ride-on vehicle, it may be desirable to not include a functional steering assembly so that the trailing vehicle cannot receive steering inputs that counteract or otherwise impair steering inputs to the leading vehicle.

Figure 7:
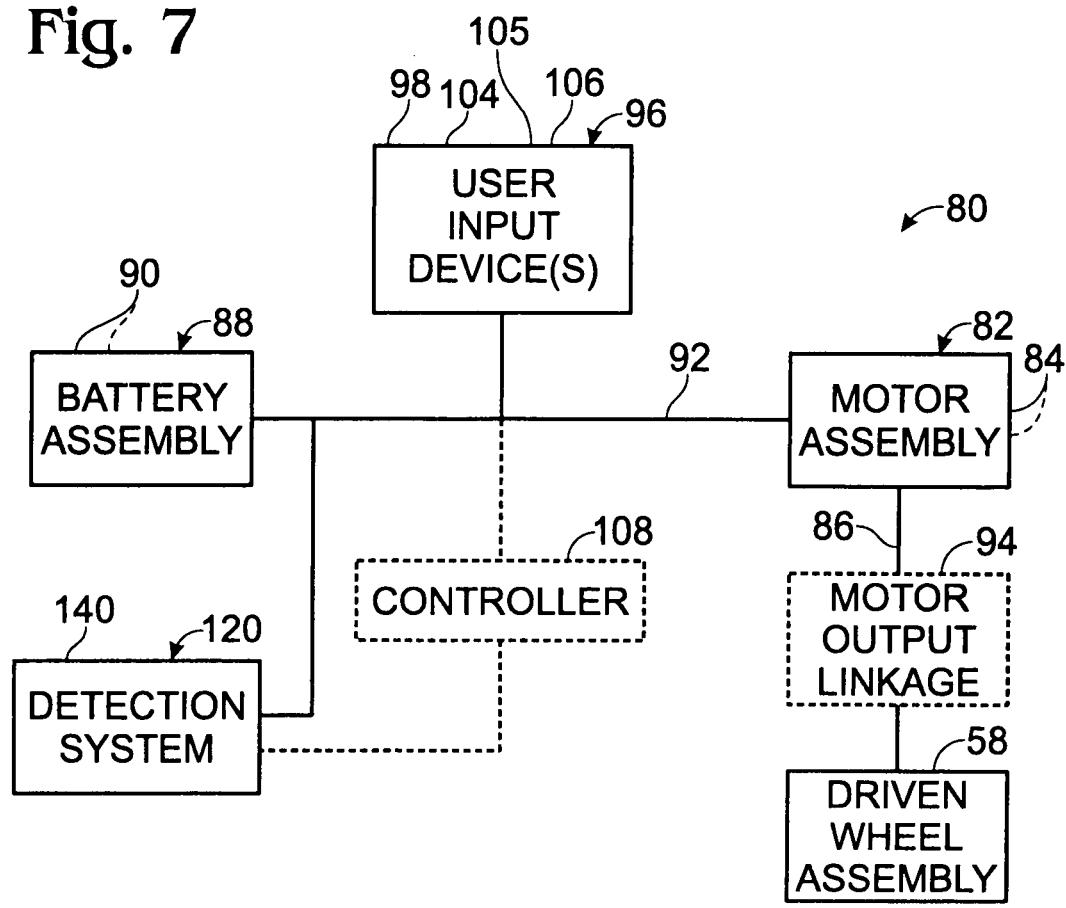
FIG. 7 is a schematic diagram of an illustrative drive assembly for children's ride-on vehicles according to the present disclosure.

As indicated at 80 in FIGS. 1 and 2, leading vehicle 12 includes a drive assembly that is adapted to drive the rotation of driven wheel assembly 58 and thereby cause ground-traveling movement of the leading vehicle and any attached trailing vehicle. As discussed, and as indicated schematically in FIG. 2 in dashed lines, it is within the scope of the present disclosure, but not required, that trailing vehicle 14 also may include a drive assembly 80. In FIG. 7, an illustrative (non-exclusive) example of a suitable drive assembly 80 for a children's ride-on vehicle, such as leading vehicle 12 and optional trailing vehicle 14, is schematically depicted. The illustrated drive assembly is an example of a drive assembly that includes a battery-powered motor assembly. Drive assembly 80 is adapted to drive the rotation of driven wheel assembly 58. The drive assembly includes a motor assembly 82, which includes at least one battery-powered motor 84 that is adapted to drive the rotation of at least one of the vehicle's driven wheels. The motor assembly includes at least one output 86 that provides a rotational input to the driven wheel(s). Typically, the output 86 from each of the one or more motors includes a rotating shaft and/or a rotation pinion or output gear. However, output 86 may include more than one shaft, pinion, and/or gear, such as when motor assembly 82 includes more than one motor and/or when driven wheel assembly 58 includes more than one driven wheel. Motor assembly 82 may also be configured to power other moveable components on vehicle 12, such as depending on the form of the vehicle.

In the illustrated schematic diagram, power for the motor assembly is provided by battery assembly 88. It is within the scope of the present disclosure that other power sources for the motor assembly may be used, in which case the battery assembly described and/or illustrated herein may be referred to as a power assembly that is adapted to energize or otherwise provide power to the motor assembly. Battery assembly 88 includes at least one battery, or cell, 90 that is adapted to provide power to the motor assembly. Any suitable type and number of batteries may be used in battery assembly 88. Although not required, the batteries are typically rechargeable batteries. For example, one or more six-, twelve-, eighteen-, or twenty-four-volt batteries have proven effective. Illustrative, non-exclusive, examples of suitable battery assemblies are disclosed in U.S. Pat. No. 6,509,719, the complete disclosure of which is hereby incorporated by reference for all purposes. The battery assembly may be operatively connected to the motor assembly by any suitable electrical connectors, such as cables, wires, or positive and negative terminals or leads, and the like. The electrical interconnections between the components of the illustrated drive assembly 80 are schematically depicted in FIG. 7 as a wiring harness 92.

In FIG. 7, drive assembly 80 is shown further including an optional motor output linkage 94 that mechanically interconnects the motor assembly with the driven wheel assembly. Motor output linkage 94 may be any suitable mechanism that transmits the rotational input from the motor assembly's output(s) to the driven wheel assembly. Examples of suitable linkages 94 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. Drive assembly 80 may be formed without motor output linkage 94, in which case the output(s) 86 of the motor assembly may directly transmit the rotational input to the driven wheel assembly.

Drive assembly 80 also includes one or more user input devices 96 that are adapted to convey inputs from a child sitting on the vehicle's seat, such as seat 26, to the vehicle's drive assembly. User input devices 96 also may be referred to as user control devices. These devices convey a user's inputs, such as via the vehicle's wiring harness 92. An illustrative example of a user input device is a drive actuator 98, which is adapted to selectively energize the vehicle's motor assembly responsive to a user, such as a child sitting on the vehicle's seat, manipulating or otherwise actuating the input device. In other words, drive actuator 98 is adapted to receive a user input directing the battery assembly to actuate or otherwise energize the motor assembly. Illustrative examples of suitable drive actuators 98 include an on/off switch, a foot pedal, a throttle lever, and a rotational handgrip on a steering mechanism that includes a handlebar. In FIG. 1, an example of a drive actuator 98 is shown in the form of a foot pedal 100 positioned for actuation by a child sitting on seat 26. When the drive actuator takes a form other than a foot pedal, it may be located in any suitable location within or near passenger region 22 so that a child sitting on seat 26 may reach the actuator while positioned to operate the vehicle. For example, an on/off switch or throttle may be located on the body or on the steering mechanism, such as illustrated at 102 in FIG. 1. Although a pair of drive actuators is illustrated in FIG. 1, the drive assembly will often only include a single drive actuator. The drive actuators may enable a user to select within a range of actuations/speeds (such as with a throttle), or simply to select whether or not the motor assembly is energized, such as with an on/off switch.

The user inputs, such as conveyed via user input device(s) 96, may also be adapted to select, or configure, the drive assembly within a plurality of drive configurations. These user inputs may be referred to as configuration inputs and are adapted to enable, or select, one or more of a plurality of drive configurations. These drive configurations may be realized, or implemented, when the motor assembly is energized, such as responsive to actuation/energization of the motor assembly. For example, the plurality of drive configurations may include one or more of the direction in which the drive assembly will propel the vehicle upon energization of the motor assembly, the relative speed or range of speed which the motor assembly is configured/energized to provide, and/or whether the drive assembly is able to be actuated responsive to an actuation input to a drive actuator 98.

For example, speed drive configurations, such as "high" and "low" speed configurations, "high," "medium," and "low" speed configurations, etc., may be selected with one or more user input devices 96 in the form of a speed switch 104. These speed drive configurations may be realized (i.e., the vehicle may be propelled according to the selected speed drive configuration) upon actuation or energization of the motor assembly. As the illustrative descriptions used above imply, the speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by a user input device in the form of a direction switch 105, which enables a user to select the relative direction (i.e., clockwise or counterclockwise) of rotation of output(s) 86 and thereby configure the vehicle to drive in forward and reverse directions upon energization of the motor assembly. A further example of drive configurations may be referred to as power configurations and relate to whether or not a user input device, such as a power switch 106, is in an "on" configuration, in which an actuation input results in actuation of the drive assembly, or an "off" configuration, in which the drive assembly is not configured to be energized by actuation inputs. Switches 104, 105 and 106 (when present) may be located in any suitable location on body 20 or steering assembly 64. Preferably, the switches or other user input devices are positioned for actuation by a child sitting on seat 26. Illustrative (non-exclusive) examples of suitable positions are shown in FIG. 1.

The drive assembly may include any suitable structure to selectively enable the plurality of drive configurations. For example, switching between forward and reverse drive configurations may be implemented by reversing the polarity of the battery assembly relative to the motor assembly. As another example, relative speed configurations may be achieved by switching two or more batteries and/or two or more motors between series and parallel configurations. As a further example, gears or similar mechanical structures may be utilized to configure relative speed configurations. As yet another example, a controller may enable the configurations via predetermined programming. Continuing this example, relative speed configurations may be achieved through pulse-width modulation or other duty cycle ramping of the energization of the motor assembly.

It is within the scope of the present disclosure that the plurality of drive configurations may include other configurations than the illustrative examples described herein. Similarly, the drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

As shown in FIG. 7, drive assembly 80 may (but is not required to) further include a controller 108, which controls the operation of the drive assembly responsive to at least one of received user inputs and predetermined programming. As an illustrative example, controller 108 may be adapted to control electronically the transmission of a user-selected speed to the driven wheel assembly and/or to configure the drive assembly to the user-selected drive configuration. Controller 108 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 96, predetermined programming, and/or inputs from other sensors or switches.

When controller 108 is adapted to regulate the energization of the motor assembly, it may regulate electronically the rotational input transmitted by the motor assembly to the driven wheel assembly. For example, controller 108 may regulate at least one of the timing and the ramp, or rate, of application of the transmission of the rotational input after actuation of a corresponding user input device by a child sitting on seat 26. In other words, the controller may be configured to delay in at least time and/or rate of transmission the rotational input to the driven wheel assembly responsive at least in part to a user input selecting the desired, or selected, rotational input. An illustrative example of a suitable controller is disclosed in U.S. Pat. No. 6,771,034, the complete disclosure of which is hereby incorporated by reference for all purposes.

It is also within the scope of the present disclosure that controller 108 may selectively control the transmission of the selected rotation input (such as determined by the selected speed configuration and/or actuation input). By this it is meant that the controller may be configured control the transmission of the selected rotational input in certain situations, such as when certain parameters or thresholds are satisfied. For example, controller 108 may only regulate the transmission of rotational input when the selected rotational input occurs when the leading vehicle is already being driven (such as during a user-selected change in speed or direction), when the leading vehicle is already traveling at more than a predetermined speed (actual or selected), when the leading vehicle changes direction, or when a second vehicle, such as trailing vehicle 14 is coupled to the leading vehicle.

As indicated in FIG. 7 at 120, the drive assembly further includes, or otherwise communicates with, a detection system that is adapted to detect whether a trailing vehicle is coupled to a vehicle, such as to a leading vehicle's connection apparatus. As such, detection system 120 may be referred to as a trailing vehicle detection system. Upon detection that the trailing vehicle is coupled to the connection apparatus of a leading vehicle, the drive assembly is adapted to automatically restrict, or disable, at least one of the plurality of drive configurations. In other words, when the trailing vehicle is not coupled to the leading vehicle, a plurality of drive configurations, such as those discussed above, are available and may be selected (such as via user inputs to devices 104-106) and may be realized or implemented (such as via inputs to drive actuator(s) 98). However, when the trailing vehicle is coupled to the leading vehicle, only a subset (i.e., less than all) of the plurality of drive configurations are available. By "available," it is meant that the drive assembly is restricted or prevented from implementing one or more of the plurality of drive configurations.

The restriction of the plurality of drive configurations to a subset of the plurality of drive configurations may be accomplished through any suitable electrical and/or mechanical mechanisms. Preferably, this restriction occurs regardless of user inputs that otherwise would select and implement the selected drive configuration if the trailing vehicle was not coupled to the leading vehicle. Furthermore, the restriction of one or more of the plurality of available drive configurations and the return to this plurality of available drive configurations preferably occurs automatically responsive to the trailing vehicle being coupled and uncoupled to the leading vehicle.

As an illustrative example, it may be desirable to prevent a leading vehicle which otherwise may be driven in forward and reverse drive configurations from being driven in a reverse drive configuration when a trailing vehicle is coupled to the leading vehicle. Upon detection of the trailing vehicle being coupled to the leading vehicle, such as by detection system 120, the drive assembly is prevented (such as via controller 108, via a suitable switch, or otherwise) from being configured to a reverse drive configuration. A child may still manipulate or otherwise press a direction input device to select a reverse drive configuration. However, the drive assembly is not reconfigured responsive to the child's actuation of the direction input device. For example, a controller may be programmed to not respond to the user input from the direction input device, the drive assembly may be toggled to disengage the reverse drive switch when the trailing vehicle is attached, a switch may be toggled (and/or a circuit selectively opened or closed) when the trailing vehicle is coupled to the leading vehicle, with the post-coupling drive assembly not enabling a reverse drive configuration, etc. When the trailing vehicle is uncoupled from the leading vehicle, the drive assembly of the leading vehicle may again be configured to a reverse drive configuration. Preferably, other than selecting a reverse drive configuration, no other action is required by the user other than to uncouple the leading and trailing vehicles.

As another illustrative example, when a trailing vehicle is coupled to a leading vehicle, detection system 120 may be utilized to prevent the drive assembly of the leading vehicle from being configured to a high-speed drive configuration and/or to a drive configuration in which the selected or actual speed exceeds a predetermined threshold. The examples of restricting reverse drive and/or high-speed drive configurations responsive to a detection system 120 detecting that a trailing vehicle is coupled to a leading vehicle are intended to be only illustrative examples. It is within the scope of the present disclosure that a vehicle's drive assembly may be configured to selectively restrict any of its plurality of drive configurations responsive to the detection that a trailing vehicle is coupled to the vehicle. As such, it should be understood that the type and number of drive configurations available to a particular ride-on vehicle may vary, such as depending upon the particular construction and components of that vehicle. The detection system and cooperating components of drive assembly 80 may be referred to herein as a means for restricting the plurality of drive configurations of the drive assembly. In the context of a drive assembly in which a reverse drive configuration is restricted, the drive assembly may be described as including means for restricting reverse driving or a reverse drive configuration. In the context of a drive assembly in which a high-speed drive configuration is restricted, the drive assembly may be described as including means for restricting a high-speed operation or a high-speed drive configuration.

Figure 8:
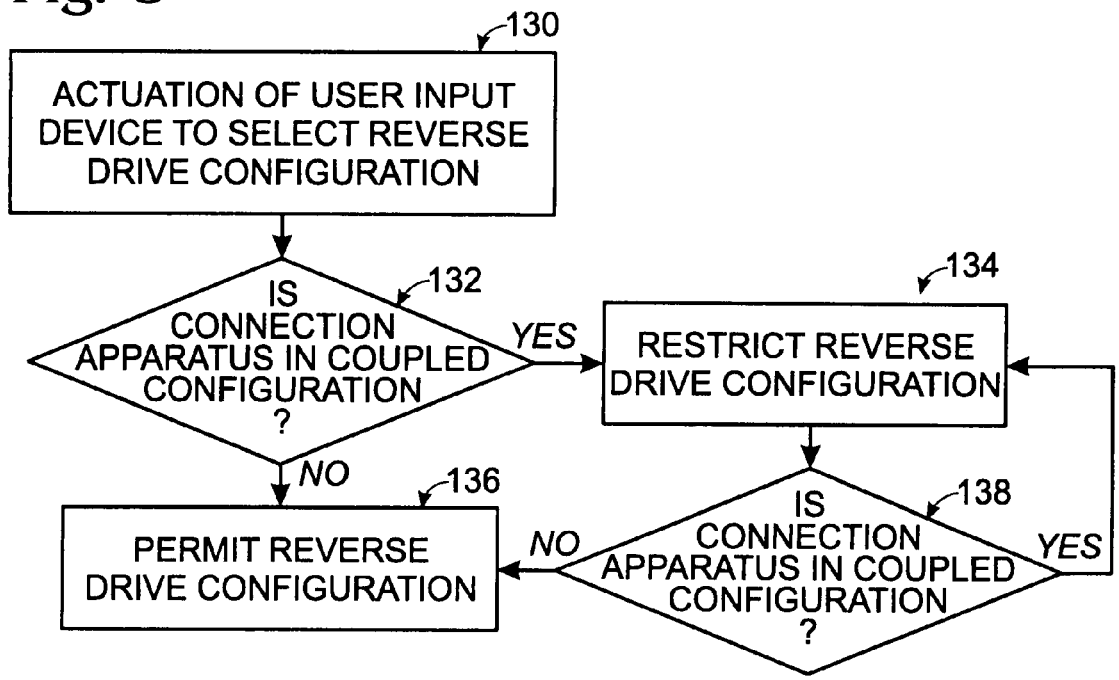
FIG. 8 is a flow chart showing illustrative examples of a vehicle's drive assembly selectively restricting a reverse drive configuration responsive to whether or not a trailing vehicle is coupled thereto.

FIG. 8 provides a flowchart illustrating examples of configurations in which the drive assembly (whether or not a controller is present) with a detection system according to the present disclosure is adapted to selectively restrict the plurality of available drive configurations when a trailing vehicle is coupled to a leading vehicle. As discussed, and as graphically depicted in FIG. 8, the detection system is adapted to detect whether or not the connection apparatus, which releasably interconnects the leading and trailing vehicles, is in its coupled or uncoupled configuration. When coupled, the plurality of drive configurations is automatically restricted to a subset thereof. When uncoupled, the full plurality of available drive configurations is automatically restored. As discussed, the fact that a drive configuration is available does not mean that it is necessarily achieved, as achieving an available drive configuration implies that a user selects that drive configuration from the plurality of available drive configurations. Although the illustrated flow chart is expressed in the context of selectively restricting reverse drive configurations, a similar flowchart may be used for other drive configurations that are restricted by the drive assembly responsive to the configuration of the connection apparatus.

At 130 in FIG. 8, a user actuates a user input device 96 to select a drive configuration from the plurality of drive configurations. In the illustrative example, the user selects a reverse drive configuration. Whether or not this drive configuration is an available or restricted one of the plurality of drive configurations determines whether or not this selected drive configuration may be achieved responsive to the user selection thereof, as indicated at 132. If the connection apparatus is in its uncoupled configuration, as detected, for example, by the detection system, then the full plurality of drive configurations are available and may be achieved as they are selected by the user. In the case of the reverse drive configuration selected in this example, if the reverse drive configuration is one of the restricted drive configurations and the connection apparatus is in its coupled configuration, then achieving the reverse drive configuration is restricted, as indicated at 136. If, however, the connection apparatus is in its uncoupled configuration, then the reverse drive configuration may be achieved, as indicated at 134. At 138, a graphical indication is shown that the determination of whether or not the connection apparatus is in its coupled or uncoupled configuration is preferably a repeated (either continuous or periodic) determination, with the reverse drive or other potentially restricted drive configuration being selectively available or restricted automatically responsive to the coupled configuration of the connection apparatus.

It is within the scope of the present disclosure that the selective restriction of the plurality of drive configurations may be coupled with an automatic selection of another of the plurality of drive configurations and/or a maintaining of the drive configuration that was selected before the restricted drive configuration was selected. For example, when a restricted drive configuration is selected while a leading vehicle's drive assembly is not being used to drive the rotation of the vehicle's driven wheel assembly, the drive assembly may be configured to simply remain in this at rest, or non-driven, drive configuration until a user selects a drive configuration that is not restricted. As another illustrative example, the drive assembly may be configured to respond to the selection of a restricted drive configuration by instead configuring one of the drive configurations that is not restricted. For example, if the above-discussed restricted reverse drive configuration is selected while the vehicle assembly is being driven in a forward drive configuration, the drive assembly may be adapted to automatically transition to an unpowered, or off, drive configuration in which the motor assembly is not energized by the battery assembly. As another illustrative example, if a high-speed drive configuration is a restricted drive configuration and is selected by a user, the drive assembly may instead maintain or configure a medium- (if not restricted) or low-speed drive configuration. As another example, it may instead select an off drive configuration, in which the vehicle's motor assembly will not be energized until a non-restricted drive configuration is selected. In such an embodiment, the vehicle assembly with either coast or brake, depending for example, upon its construction.

Figure 9:
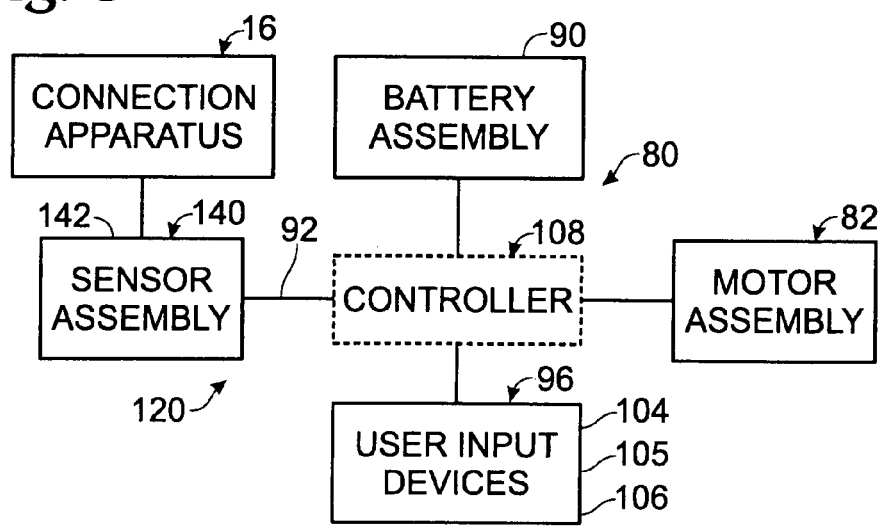
FIG. 9 is a schematic diagram of a portion of the drive assembly shown in FIG. 7 including communication between a connection apparatus and a detection system.

Detection system 120 may utilize any suitable structure for detecting when a trailing vehicle is coupled to a leading vehicle. For example, the detection system may include a sensor assembly 140, as indicated in FIG. 7. As indicated in FIG. 9, sensor assembly 140 may include one or more sensors 142 that are adapted to detect whether or not the connection apparatus is in its coupled configuration. For example, the one or more sensors may be actuated upon coupling or decoupling of a trailing vehicle to a leading vehicle via connection apparatus 16. Sensor assembly 140 may include any suitable number and type of structure for detecting or otherwise determining whether or not the trailing vehicle is coupled to the leading vehicle via the connection apparatus, i.e., whether the connection apparatus is in its coupled configuration. Illustrative, non-exclusive examples include one or more of an electrical sensor, an optical sensor, a mechanical sensor, conductive contacts, a magnetic sensor, or other suitable sensing or measuring device. FIG. 9 also graphically depicts that detection system 120, such as via sensor assembly 140, selectively communicates with connection apparatus 16 and the rest of drive assembly 80, which in turn selectively permits or restricts one or more of the plurality of drive configurations responsive to inputs or other signals from the detection system. When drive assembly 80 includes a controller, the sensor assembly may (but is not required to) communicate with the controller. In view of the above, the detection system may be described as including means for detecting when the connection apparatus is in the coupled configuration.

As discussed, the leading and trailing vehicles are removably interconnected by a connection apparatus 16. Connection apparatus 16 refers generally to any suitable structure for selectively interconnecting the leading and trailing vehicles so that driving movement of the leading vehicle will draw the trailing vehicle for movement with the leading vehicle. By "removably interconnected," it is meant that the interconnecting structures of the vehicles that comprise the connection apparatus are adapted to be repeatedly interconnected, or coupled together, for the vehicle assembly to move as a unit, and disconnected, or uncoupled from each other, for the leading and/or trailing vehicles to be moved, driven or otherwise used independent of the other vehicle. An illustrative example of a suitable connection apparatus is a hitch assembly 18, with non-exclusive examples of suitable hitches disclosed in the above-incorporated patent application. The connection apparatus preferably enables pivotal movement of the leading and trailing vehicles, but this is not required, as one or both of the vehicles may include other structure or mechanisms that enable this pivotal movement, or the vehicle assembly may be configured so that the trailing vehicle remains in a fixed orientation relative to the leading vehicle. As also discussed, the vehicle assembly includes a detection system that is adapted to detect whether or not the trailing vehicle is coupled to the leading vehicle, such as by detecting whether the connection apparatus is in its coupled or uncoupled configuration, and selectively restricting the available ones of a plurality of drive configurations of the leading vehicle responsive thereto.

In FIGS. 10-14 illustrative examples of connection apparatus are shown. In the illustrated examples, connection apparatus 16 include portions 150 and 152 that respectively form part of each of the leading and trailing vehicles. These portions are adapted to interconnect with each other to couple the vehicles together, with the detection system including a sensor assembly 140 that detects whether or not this operative configuration exists. It is within the scope of the present disclosure that the entire connection apparatus exists on one of the vehicles, such as on the leading vehicle. It is also within the scope of the disclosure that the connection apparatus includes a specialized structure on one of the vehicles, such as a clamp or other component that is adapted to engage any of a series of portions on the other vehicle. In other words, it is not required for both vehicles to include specially designed components for the resulting vehicle assembly to be described as including a connection apparatus. What is important is that the vehicle assembly includes a suitable mechanism for releasably coupling the vehicles together for movement as a unit and a suitable detection system for determining whether the vehicles are coupled together and restricting the driving configurations of the leading vehicle if the vehicles are coupled together.

In FIG. 10, a connection apparatus 16 is shown in the form of a hitch assembly 18 that includes interconnecting portions 150 and 152 that have a ball-and-socket configuration. In the illustrated example, portion 150 is shown forming a portion of trailing vehicle 14, and portion 152 is shown forming a portion of leading vehicle 12, with a portion of the leading vehicle's wiring harness 92 being shown in fragmentary lines. As also illustrated, portion 152 includes a ball portion 154 onto which, and/or around which, a socket portion 156 of portion 150 extends. Sensor assembly 140 of detection system 120 includes a switch 158 that is adapted to be moved from its unactuated, or resting, position (shown in dashed lines), to its actuated, or coupled, position (shown in solid lines) when the socket portion is coupled to the ball portion. When moved from its first position to its second position, the switch may selectively open or close a circuit or otherwise send a signal to the controller or other portion of the drive assembly, thereby communicating the coupled configuration of the connection apparatus and resulting in the corresponding restriction of the driving configurations available to the drive assembly of the leading vehicle. In the illustrated example, placing the socket portion in an operative position on the ball portion depresses or otherwise moves the switch from its first, unactuated position to its second, actuated position. Preferably, a switch, such as switch 158, that is selectively moved between first and second positions responsive to whether or not the trailing vehicle is coupled to the leading vehicle (i.e., responsive to whether the connection apparatus is in its coupled or uncoupled configuration), also includes a suitable biasing mechanism 160 that biases the switch to its unactuated position. Any suitable structure may be used for biasing mechanisms, such as springs, resilient members, and the like. Therefore, when the trailing vehicle is disconnected from the leading vehicle and the connector apparatus is thereby in its uncoupled configuration, the switch automatically returns to its first, unactuated position. It is within the scope of the present disclosure that the switch may be otherwise positioned on the ball portion. Similarly, the switch of sensor assembly 140 may extend from the socket portion, with the switch being actuated by the socket engaging the ball portion, such as by the ball portion engaging a depressable or otherwise moveable switch. In such an embodiment, portion 150 would be described as forming a portion of leading vehicle 12, and portion 152 would be described as forming a portion of trailing vehicle 14. The illustrated geometry and configuration of the ball and socket portions may vary without departing from the scope of the disclosure.

Another illustrative example of a connection apparatus 16 with a detection system 120 that includes a sensor assembly 140 adapted to detect whether or not the connection apparatus is in its coupled or uncoupled configuration is shown in FIG. 11. As shown, interconnecting portion 150 includes a projecting member 161 that defines a guide 162. Portion 152 includes a socket, or aperture, 164 that is adapted to be mounted on the guide to couple the portions together and thereby configure the connection apparatus to its coupled configuration. The detection system shown in FIG. 11 includes a sensor assembly 140 with a pair of spaced-apart metallic or otherwise conductive sensors 142 that are in communication with the drive assembly of the leading vehicle, such as via wiring harness 92. As also shown, portion 152 includes a metallic or other conductive portion 166 that, upon coupling portions 150 and 152 together to place the connection apparatus in its coupled configuration, forms a conductive path between sensors 142. These conductive sensors may be described as forming a switch that is selectively configured between a first position, in which the conductive path is not formed between sensors 142 and portion 166, and a second position, in which the conductive path is formed. Detection system 120 detects the resulting signal or closed circuit. The contacts may, but are not required to, include or be associated with magnetic portions to urge the contacts together. This illustrative example does not require the sensor to include a biased switch and instead relies upon a conductive path being selectively completed or interrupted responsive to the coupled or uncoupled configuration of the connection apparatus. Portions 150 and 152 may be shaped to provide a pivotal connection or a non-pivotal connection, such as defined by the shape of member 161 and/or socket 164. If portions 150 and 152 are designed to pivot relative to each other, sensors 142 and/or conductive portion 166 should be sized and/or shaped to maintain the desired conductive path through the pivotal range of movement. Variants to this configuration have sensors 142 biased apart from each other, and portion 152 urging the conductive sensors into contact with each other when the connection apparatus is in its coupled configuration. As shown in dashed lines in FIG. 11, the guide has a variety of configurations, including configurations in which the guide inhibits removal of portion 152 or otherwise restricts unintentional separation of the portions. Similar to the example shown in FIG. 10, portions 150 and 152 may be reversed relative to the leading and the trailing vehicles. In such a configuration, the conductive portions may also be reversed.

A further example of a connection apparatus 16 in the form of a hitch assembly 18 having a pin-and-socket configuration is shown in FIGS. 12-14. In FIG. 12, portion 150 is shown including a projecting, or linking member, 170 that is adapted to be received into, or by, a corresponding socket, or receiver, 171 on portion 152, which is shown in FIG. 13 and defines a passage or aperture 172. In the illustrative example of a projecting member shown in FIG. 12, the member extends from a body 174, which may have a variety of forms without departing from the scope of the present disclosure. For example, the body may be integrally formed with one of the vehicles, pivotally coupled to one of the vehicles, mounted on one of the vehicles, etc. In the illustrated example, projecting member 161 has a rectangular cross-section (relative to its long axis or axis of insertion into passage 172), but other configurations may be used. For example, a circular cross-section may be used to enable rotation of the projecting member with the receiver, such as to enable pivotal movement of the leading and trailing vehicles relative to each other while the connection apparatus is in its coupled configuration. The illustrative example of a projecting member also includes an example of a retention mechanism 176 that is adapted to retain the projecting member within the receiver and thereby retain the connection apparatus in a coupled configuration. As shown, retention mechanism 176 includes a pair of spaced-apart legs, or prongs, 178, each of which includes a ridge, or detent portion, 180. Detent portions are adapted to extend sufficiently into or through passage 172 to restrict unintentional withdrawal of the prongs from the receiver. Prongs 178 may be formed of a material of a predetermined elasticity, or be otherwise mechanically reinforced, to require a predetermined amount of compressive force to be applied before the ridges are urged sufficiently toward each other than they can be withdrawn through passage 172. In other embodiments, the connection apparatus may be supplied with a key-operable locking mechanism or similar device suitable to prevent unintentional uncoupling.

In FIG. 13 the connection apparatus illustrates another example of a detection system 120 with a sensor assembly 140 having a pair of spaced-apart metallic or otherwise conductive sensors 142, with portion 150 (which is perhaps best seen in FIG. 12) including a metallic or otherwise conductive bridging, or spanning, member 166 that is adapted to form a conductive path with the sensors 142 when the connection apparatus is in its coupled configuration. In FIG. 14, the pin-and-socket assembly provides another example of a detection system 120 with a sensor assembly 140 with a sensor 142 in the form of a switch that is moved, preferably against its bias, between at least first and second positions by the coupling of portions 150 and 152 together. In this embodiment, conductive portion 166 is not needed on portion 150.

While illustrative examples of drive assemblies with trailing vehicle detection systems according to the present disclosure have been illustrated and described herein, drive assemblies and corresponding detection systems may take a wide variety of other forms, as desired or beneficial for a particular application, without departing from the scope of the present disclosure.

INDUSTRIAL APPLICABILITY

The present disclosure is applicable to battery-powered children's ride-on vehicles, and especially children's ride-on vehicle assemblies that include leading and towed vehicles.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and subcombinations of features, functions, elements and/or properties that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle adapted to be a leading vehicle of a children's ride-on vehicle assembly having a leading vehicle and a trailing vehicle, the leading vehicle comprising:
 a leading vehicle body having at least one seat adapted to receive a child;
 a plurality of wheels rotatably coupled to the leading vehicle body and including at least one driven wheel and at least one steerable wheel;
 a steering assembly including a steering mechanism adapted to receive steering inputs from a child sitting on the at least one seat and to convey the steering inputs to the at least one steerable wheel;
 at least a portion of a connection apparatus adapted to selectively couple a trailing vehicle to the leading vehicle for relative movement with the leading vehicle, wherein the connection apparatus is in a coupled configuration when the trailing vehicle is coupled to the leading vehicle and in an uncoupled configuration when the trailing vehicle is not coupled to the leading vehicle; and
 a drive assembly selectively configured to rotationally drive the at least one driven wheel of the leading vehicle in a plurality of drive configurations, the drive assembly comprising:
  at least one user input device adapted to selectively actuate the drive assembly; and
  a sensor assembly adapted to detect when the connection apparatus is in the coupled configuration, wherein the drive assembly restricts driving of the at least one driven wheel to a subset of the plurality of drive configurations when the sensor assembly detects that the connection apparatus is in the coupled configuration, and further wherein the plurality of drive configurations includes at least one drive configuration that is not in the subset of the plurality of drive configurations.

2. The ride-on vehicle of claim 1, wherein the at least one user input device includes at least one configuration input device adapted to receive user inputs selecting amongst the plurality of drive configurations.

3. The ride-on vehicle of claim 1, wherein the drive assembly is adapted to be selectively configurable within the plurality of drive configurations when the connection apparatus is not in the coupled configuration.

4. The ride-on vehicle of claim 1, wherein the plurality of drive configurations and the subset of the plurality of drive configurations include at least one forward drive configuration in which the at least one driven wheel is driven in a forward direction.

5. The ride-on vehicle of claim 4, wherein the plurality of drive configurations further includes at least one reverse drive configuration in which the at least one driven wheel is driven in a reverse direction, and further wherein the subset of the plurality of drive configurations does not include a reverse drive configuration.

6. The ride-on vehicle of claim 4, wherein the plurality of drive configurations and the subset of the plurality of drive configurations include at least a first speed drive configuration, in which the drive assembly is adapted to drive the rotation of the at least one driven wheel at a first speed.

7. The ride-on vehicle of claim 6, wherein the plurality of drive configurations further includes a second speed drive configuration, in which the drive assembly is adapted to drive the rotation of the at least one driven wheel at a second speed that is greater than the first speed, and further wherein the subset of the plurality of drive configurations does not include the second speed drive configuration.

8. The ride-on vehicle of claim 6, wherein the plurality of drive configurations and the subset of the plurality of drive configurations further include a second speed drive configuration, in which the drive assembly is adapted to drive the rotation of the at least one driven wheel at a second speed that is greater than the first speed.

9. The ride-on vehicle of claim 1, wherein the plurality of drive configurations and the subset of the plurality of drive configurations include at least a first speed drive configuration, in which the drive assembly is adapted to drive the rotation of the at least one driven wheel at a first speed, wherein the plurality of drive configurations includes a second speed drive configuration, in which the drive assembly is adapted to drive the rotation of the at least one driven wheel at a second speed that is greater than the first speed, and further wherein the subset of the plurality of drive configurations does not include the second speed drive configuration.

10. The ride-on vehicle of claim 1, wherein the drive assembly further comprises a controller adapted to regulate at least one of the direction and the rate in which the at least one driven wheel is driven by the drive assembly.

11. The ride-on vehicle of claim 10, wherein the controller is adapted to communicate with the sensor assembly to restrict driving of the at least one driven wheel to the subset of the plurality of drive configurations when the connection apparatus is in the coupled configuration.

12. The ride-on vehicle of claim 1, wherein the sensor assembly includes a switch adapted to move between a first position, corresponding to the uncoupled configuration, and a second position, corresponding to the coupled configuration.

13. The ride-on vehicle of claim 12, wherein when the switch is in the first position, the drive assembly is adapted to selectively be configured to rotationally drive the at least one driven wheel in any of the plurality of drive configurations, and further wherein when the switch is in the second position, the drive assembly restricts driving of the at least one driven wheel to the subset of the plurality of drive configurations.

14. The ride-on vehicle of claim 13, wherein the switch is adapted to be automatically moved to the second position responsive to the connection apparatus being configured from the uncoupled configuration to the coupled configuration.

15. The ride-on vehicle of claim 14, wherein the switch is adapted to automatically return to the first position when the connection apparatus is configured from the coupled configuration to the uncoupled configuration.

16. The ride-on vehicle of claim 12, wherein the switch is adapted to complete a circuit when moved to the second position.

17. The ride-on vehicle of claim 12, wherein the switch is adapted to open a circuit when moved to the second position.

18. The ride-on vehicle of claim 1, wherein the connection apparatus includes at least a portion of a hitch assembly adapted to selectively couple the trailing vehicle to the leading vehicle for relative movement with the leading vehicle.

19. The ride-on vehicle of claim 1, in combination with a trailing vehicle adapted to be removably coupled to the leading vehicle by the connection apparatus.

20. A children's ride-on vehicle adapted to be a leading vehicle of a children's ride-on vehicle assembly having a leading vehicle and a trailing vehicle, the leading vehicle comprising:
 a leading vehicle body having at least one seat adapted to receive a child;

a plurality of wheels rotatably coupled to the leading vehicle body and including at least one driven wheel and at least one steerable wheel;

a steering assembly including a steering mechanism adapted to receive steering inputs from a child sitting on the at least one seat and to convey the steering inputs to the at least one steerable wheel;

at least a portion of a connection apparatus adapted to selectively couple a trailing vehicle to the leading vehicle for relative movement with the leading vehicle, wherein the connection apparatus is in a coupled configuration when the trailing vehicle is coupled to the leading vehicle and in an uncoupled configuration when the trailing vehicle is not coupled to the leading vehicle; and a drive assembly selectively configured to rotationally drive the at least one driven wheel of the leading vehicle in a plurality of drive configurations, the drive assembly comprising:

at least one user input device adapted to selectively actuate the drive assembly; and a sensor assembly adapted to detect when the connection apparatus is in the coupled configuration, wherein the drive assembly restricts driving of the at least one driven wheel to a subset of the plurality of drive configurations when the sensor assembly detects that the connection apparatus is in the coupled configuration, wherein the plurality of drive configurations includes at least one drive configuration that is not in the subset of the plurality of drive configurations, and further wherein the drive assembly restricts the plurality of drive configurations when the sensor assembly detects that the connection apparatus is in the coupled configuration regardless of user inputs selecting a drive configuration that is in the plurality of drive configurations but not in the subset of the plurality of drive configurations.

* * * * *

UNITED STATES PATENT AND TRADEMARK OFFICE
CERTIFICATE OF CORRECTION

PATENT NO. : 7,621,552 B2
APPLICATION NO. : 11/728049
DATED : November 24, 2009
INVENTOR(S) : J. Bergum et al.

It is certified that error appears in the above-identified patent and that said Letters Patent is hereby corrected as shown below:

Column 19, line 5, "sifting" should be changed to --sitting--.

Signed and Sealed this

Sixteenth Day of February, 2010

David J. Kappos
*Director of the United States Patent and Trademark Office*